United States Patent [19]

Hendrixon et al.

[11] Patent Number: 5,000,421

[45] **Date of Patent: * Mar. 19, 1991**

[54] ELECTROMAGNETIC SOLENOID VALVE WITH VARIABLE FORCE MOTOR

[75] Inventors: John L. Hendrixon, Shelby; David J. Domanchuk, Grand Haven; Allen F. Pearson, Muskegon, all of Mich.

[73] Assignee: SPX Corporation, Muskegon, Mich.

[ * ] Notice: The portion of the term of this patent subsequent to Sep. 5, 2006 has been disclaimed.

[21] Appl. No.: 367,976

[22] Filed: Jun. 19, 1989

Related U.S. Application Data

[62] Division of Ser. No. 188,363, Apr. 29, 1988, Pat. No. 4,863,142.

[51] Int. Cl.[5] .............................................. F16K 31/06

[52] U.S. Cl. .......................... 251/129.08; 251/129.14; 137/625.65; 310/14; 310/30

[58] Field of Search ...................... 251/129.14, 129.08; 335/280; 137/625.65; 310/14, 30

[56] References Cited

U.S. PATENT DOCUMENTS 4,570,904 2/1986 Mullally ......................... 251/129.21
4,595,035 6/1986 Warrick ..................... 251/129.14 X
4,674,536 6/1987 Warrick ..................... 251/129.14 X

FOREIGN PATENT DOCUMENTS 90475 6/1982 Japan ............................. 251/129.08

*Primary Examiner*—Arnold Rosenthal
*Attorney, Agent, or Firm*—Barnes, Kisselle, Raisch, Choate, Whittemore & Hulbert

[57] ABSTRACT

A solenoid valve which includes a valve body having a central bore from which fluid passages radially extend. A valve spool is axially slidably captured within the valve body bore to control passage of fluid among the valve body passages. An electromagnetic variable force motor is mounted on the valve body and includes a housing of ferromagnetic construction with a pole piece of ferromagnetic construction coaxial with the valve spool and surrounded by an electrical coil. An armature comprising a ball of ferromagnetic construction is positioned coaxially with the pole piece in abutting engagement with the valve spool. A coil spring is positioned to engage the ball-armature and to urge the same axially away from the pole piece. The characteristic of magnetic attraction between the ball-armature and the opposing face of the pole piece as a function of separation therebetween is substantially identical with spring rate, both preferably being a linear function of ball-armature displacement.

20 Claims, 2 Drawing Sheets

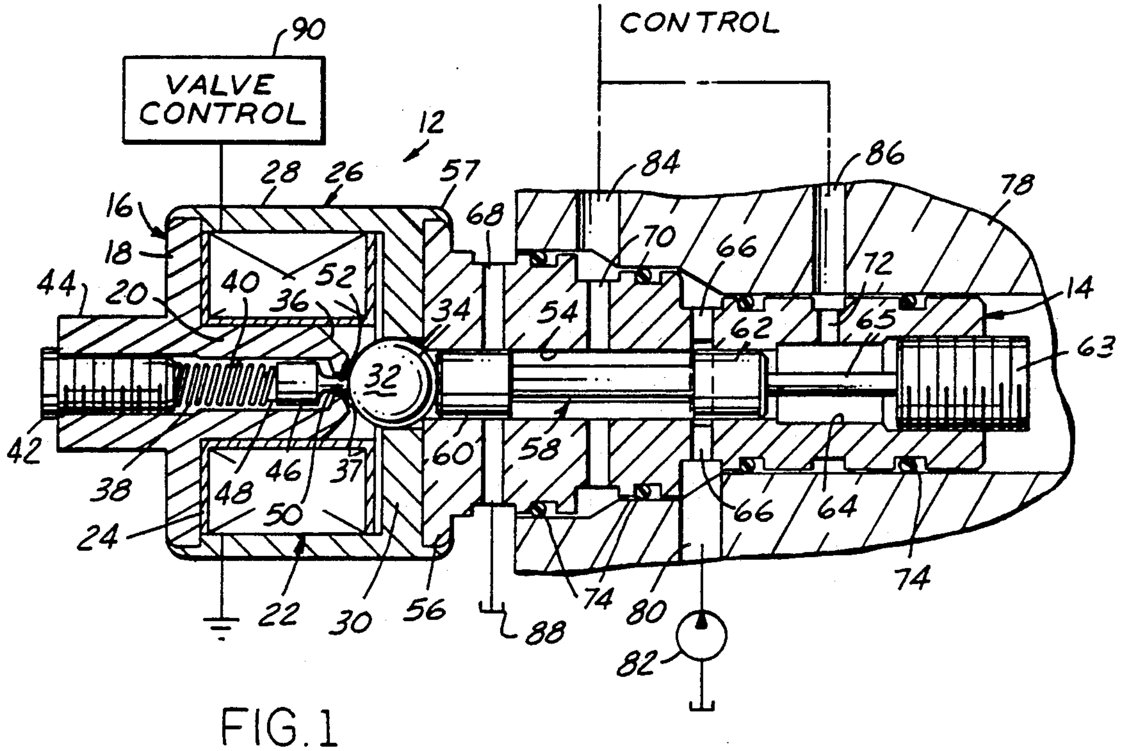
FIG.1
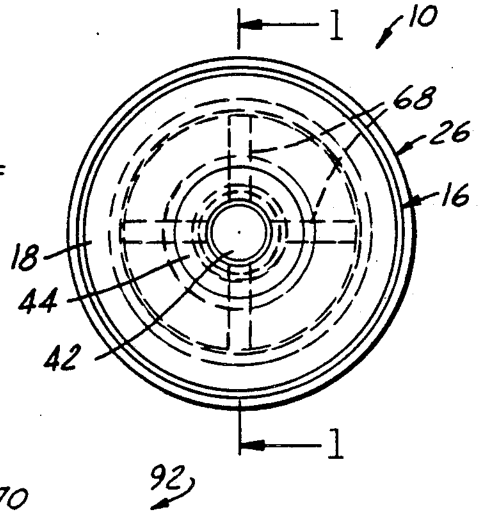
FIG.2
FIG.3
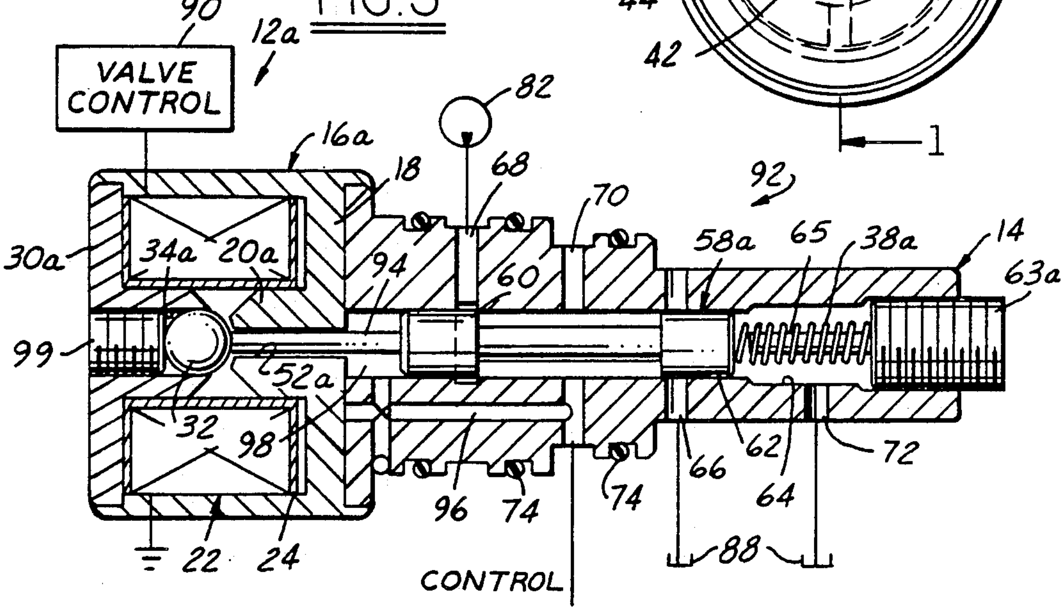

ELECTROMAGNETIC SOLENOID VALVE WITH VARIABLE FORCE MOTOR

This is a continuation of co-pending application Ser. No. 188,363 filed on Apr. 29, 1988, now U.S. Pat. No. 4,863,142, dated Sept. 5, 1989.

The present invention is directed to electromagnetic variable force motors, and more particularly to a solenoid valve embodying such a motor for variably controlling pressure and/or flow of fluid.

BACKGROUND AND OBJECTS OF THE INVENTION

Electromagnetic variable force motors of the subject type include a pole piece having a central structure surrounded by a coil, an armature positioned for motion toward and away from the pole piece, and a spring for urging the armature away from the pole. The pole piece and armature are of ferromagnetic construction so that current in the coil establishes a magnetic field in the pole piece, attracting the armature toward the pole against the force of the spring. Sliding friction between the armature and surrounding structure, only partially reduced by armature guide and bushing structures, results in energy loss and position hysteresis between the armature and pole piece. Furthermore, armature and pole piece structures contoured to obtain a desired force characteristic relative to coil current are often complex and expensive to manufacture. One exemplary solenoid valve embodying a linear force motor of the described character is disclosed in U.S. Pat. No. 4,579,145.

U.S. Pat. Nos. 4,570,904 and 4,595,035, both assigned to the assignee hereof, disclose solenoid-operated modulating valves in which a ball of ferromagnetic construction serves as both the solenoid armature and the on/off valve element. A coil spring is captured within a central cavity in the pole piece and has an end tine which extends through a passage in the pole face to engage the ball and position the ball in normally-closing engagement with an opposing fluid passage valve seat spaced from the pole piece. The face of the pole tapers narrowingly in the direction of the ball for enhanced magnetic coupling therebetween. Fluid flow through the valve is controlled by pulse width modulation of the coil drive signal. Although the modulating valves so disclosed have enjoyed substantial acceptance and success, they often cannot substitute or satisfy requirements for variable force motor type solenoid valves.

It is an object of the present invention to provide an electromagnetic variable force motor which exhibits reduced friction between the armature and surrounding pole piece and housing structures, and thereby obtains both reduced energy loss and reduced hysteresis in armature movement.

Another object of the present invention is to provide a solenoid valve which embodies an electromagnetic variable force motor of the described character for enhanced precision control of fluids, such as hydraulic fluids in electronically controlled fluid transmissions.

A further object of the invention is to provide a solenoid valve of the described character which exhibits reduced size and complexity, and which is thus more economical to manufacture than are variable force motor solenoid valves of the prior art.

SUMMARY OF THE INVENTION

In accordance with one aspect of the present invention, an electromagnetic variable force motor comprises a pole piece of ferromagnetic construction and an electrical coil coaxially surrounding the pole. The motor armature comprises a ball of ferromagnetic construction positioned coaxially with the pole. The ball-armature and pole have a preselected characteristic (typically empirically preselected) of magnetic attractive force between the armature and pole that is a function of ball armature size and armature travel or gap between the ball armature and opposing pole face when current is applied to the coil. Ball size and armature travel are selected in a manner such that the magnetic attractive force is compatible with the desired management characteristic for the flow and pressure requirements. A spring engages the ball-armature and urges the same away from the opposing pole face. The spring has a spring rate which is substantially identical to the magnetic-force/generated between the pole piece and ballarmature. That is, magnetic attractive force caused by a given current in the coil and a corresponding reduction in the armature/pole piece air gap is substantially identically balanced by a change in compression and corresponding force in the spring. Most preferably, such armature/pole piece force characteristic and spring rate are both substantially linear, such that displacement of the ball-armature with respect to the pole piece against force of the spring varies substantially linearly with current to the coil.

In the preferred embodiments of the invention, a housing encloses the pole piece and armature and has journalling surfaces which surround the ball-armature, guiding axial motion thereof while limiting motion transversely of the pole piece axis. The structure which transmits the spring force to the ball-armature is configured so as to limit contact with the surrounding pole piece and housing. There is thus limited contact and friction between the moving elements of the force motor—i.e., the ballarmature and spring force-transmitting element–and the surrounding housing. As a result, hysteresis in ball-armature position versus current is substantially eliminated.

A solenoid valve in accordance with the present invention comprises a valve body having a bore with a central axis and fluid passages extending radially or transversely therefrom. A valve element is axially slidably captured within the bore and cooperates with the valve body passages for varying flow of fluid therethrough. A housing of ferromagnetic material is mounted on the valve body, and includes a ferromagnetic pole piece coaxially with the bore and an electrical coil circumferentially surrounding the pole piece. A ball-armature is positioned in coaxial opposition to the pole in engagement with the valve element, and a spring is positioned to engage the ball-armature to urge the same away from the opposing face of the pole piece. The valve element, which is preferably constructed separately from the ball-armature, comprises a valve spool in the preferred embodiments of the invention having axially spaced lands which cooperate with the valve body passages extending from the central bore.

BRIEF DESCRIPTION OF THE DRAWINGS

The invention, together with additional objects, features and advantages thereof, will be best understood from the following description, the appended claims and the accompanying drawings in which:

FIG. 1 is a sectional view in side elevation diametrically bisecting a solenoid valve configured as a pressure control valve in accordance with one presently preferred embodiment of the invention;

FIG. 2 is an end elevational view of the solenoid valve of FIG. 1, FIG. 1 being taken substantially along the line 1—1 in FIG. 2;

FIG. 3 is a sectional view similar to that of FIG. 1 showing a modified solenoid valve in accordance with the present invention configured as a pressure control valve.

DETAILED DESCRIPTION OF PREFERRED EMBODIMENTS

Figure 4:
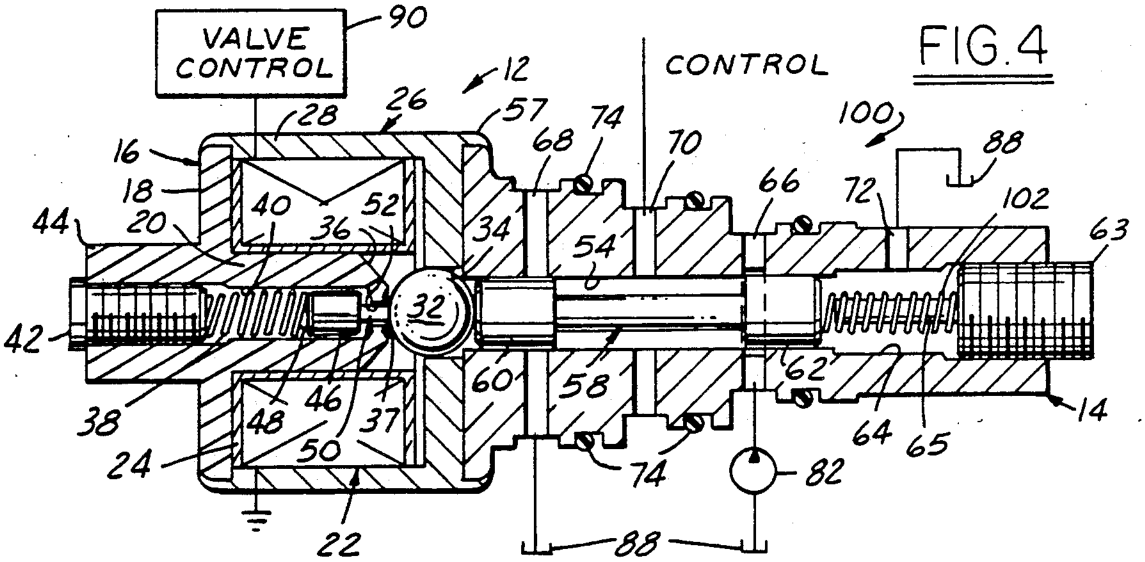
FIGS. 4 and 5 are sectional views of modified embodiments of the invention respectively similar to those of FIGS. 1 and 3 and configured as flow control valves.

FIGS. 1 and 2 illustrate an electromagnetic variable force motor solenoid valve 10 in accordance with a presently preferred embodiment of the invention as comprising an electromagnetic variable force motor 12 mounted on a valve body 14. Force motor 12 includes a pole piece 16 having a base 18 of ferromagnetic construction. A substantially cylindrical pole piece 20 integrally axially extends from base 18 and is circumferentially surrounded by an electrical coil assembly 22, including electrical wire wound on a suitable bobbin 24. A housing 26 of ferromagnetic construction has a side wall 28 which encloses coil assembly 22 and is crimped or otherwise formed over the periphery of base 18. The flat base 30 of housing 26 is parallel to base 18, being axially spaced therefrom by coil assembly 22. The axial length of pole 20 is less than the axial length of coil assembly 22 and sidewall 28, so that pole 20 is separated and spaced from opposing base 30 by an air gap.

An armature 32, preferably consisting of a solid spherical ball of ferromagnetic construction, is slidably captured within a central opening 34 in housing base 30 coaxially with pole piece 20. There is thus formed for magnetic flux generated by coil 22 a closed magnetic path through pole piece 20, pole piece base 18, housing sidewall 28, housing base 30, ball-armature 32 and the air gap between ball-armature 32 and pole piece 20. The axially oriented face 36 of pole 20 tapers narrowingly toward ball 32 to focus the magnetic flux at pole face 37. Preferred angle of taper of outer face 36 is about 45° on a cone of revolution centered on the pole axis. Inner pole face 37 immediately opposite ball-armature 32 is concave at a radius greater than that of the ball-armature to maintain flux distribution as the ball-armature approaches the pole face 37. Ball armature 32 is of a size such that at least half of the ball volume remains within opening 34. Stated differently, axial separation between pole face 37 and housing base 34 is less than one-half of the diameter of ball-armature 32. In this way, the magnetic discontinuity between ball-armature 32 and housing base 30 remains substantially constant throughout motion of the ball-armature, and does not affect linearity of such motion as a function of magnetic force and stator current.

A coil spring 38 is captured in compression within a central axially-extending cavity 40 in pole 20 between an adjustment screw 42 threaded into a boss 44 which projects outwardly from pole piece base 18 and a pintle 46 for transmitting force from spring 38 to ball-armature 32. A central boss 48 extends from the base of the pintle body into the coils of spring 38 in close-fitting relationship therewith for maintaining position of the pintle centrally of the spring. A finger 50 extends from the opposing end of pintle 46 through a central passage 52 in pole face 37 into opposed abutting engagement with ball-armature 32 coaxially with pole 20 and ball-armature 32. Preferably, the outside diameter of pintle 46 is less than the inside diameter of cavity 40, and the pintle finger 50 is slidably positioned in passage 52. Pintle 46 is preferably of nonmagnetic construction, but not restricted to non-magnetic materials.

Valve body 14 is of non-magnetic construction but not restricted to non-magnetic materials and has an outer end flange 56. An encompassing flange 57 on housing 26 is crimped or otherwise formed over the periphery of valve body flange 56 to form the unitary valve assembly 10. A central bore 54 extends through valve body 14 in coaxial alignment with ball-armature 32 and pole 20. A valve spool 58, having a pair of axially spaced integrally connected lands 60,62, is axially slidably positioned within valve body bore 54. An adjustable stop 63 is threadably received into a cavity 64 at the armature-remote end of bore 54 and has a finger 65 extending through cavity 64 for coaxial abutting engagement with spool land 62. Force motor spring 38 and pintle 46 urge ball-armature 32 into abutting engagement with an opposing face of spool land 60, and thereby urges spool 58 toward abutment with stop finger 65. Spool 58 is thus captured within bore 54 between ball-armature 32 and stop 63.

A first passage 66, specifically a circumferential series of four passages 66 at 90° angular spacing, extends from bore 54 to the outer surface of valve body 14 from a position generally radially adjacent to valve spool land 62. A channel extends around bore 54 and interconnects the radially inner ends of passages 66. A second passage 68, specifically a circumferential array of four passages 68 at 90° spacing (FIG. 2), extends from bore 54 to the outer surface of valve body 14 from a position generally radially adjacent to spool land 60. A third passage 70, specifically a circumferential array of four passages 70 at 90° spacing, extends from bore 54 to the outer periphery of valve body 14 from a position approximately mid-way between spool lands 60,62. A fourth passage 72 radially extends from cavity 64 to the valve body periphery. Sealing rings 74 are positioned in corresponding grooves in the outer periphery of valve body 14 between axially adjacent valve body passages. The outer ends of each series of valve body passages 66,68,70,72 are connected to corresponding channels in the valve body outer surface.

Valve 10 in the embodiment of FIG. 1 is illustrated as being assembled to a manifold 78. A first passage 80 in manifold 78 couples valve body passages 66 to an hydraulic pump 82. Manifold passage 84, which is connected to valve body passage 70, supplies controlled pressure to an external device. Manifold passage 86, which is interconnected to manifold passage 84, provides control pressure feedback to the face of the spool land 62. Valve body passages 68 are positioned externally of manifold 78 and are connected to fluid sump 88. Solenoid coil 22 is connected to a suitable source 90 of valve control signals. It will be appreciated, of course, that outer surface contour of valve body 14 will depend upon manifold 78, with the contour of FIG. 1 (and FIGS. 3–5) being exemplary only. Likewise, positioning and sizes of passages 66–70 will depend on flow requirements and other considerations not directly germane to the present invention.

Valve 10 is thus configured in the embodiment of FIGS. 1 and 2 as a pressure control valve for applying controlled pressure from pump 82 to an external device (not shown) as a function of current input signals from controller 90 to coil 22. In the fully de-energized condition of valve 10 illustrated in FIG. 1—i.e., with no current applied to coil 22—spool 58 is urged against stop 63 by spring 38, pintle 46 and ball-armature 32. Passages 80,66 are thus opened through bore 54 to passages 70,84, and maximum control pressure is applied from pump 82 to the external device. Such control pressure is returned to cavity 64 by passages 86,72 so as to act against the armature-remote face of spool land 62 urging spool valve 58 and ball-armature 32 against pintle 46. As current is applied by valve control electronics 90 to solenoid coil 22, ball-armature 32 is increasingly attracted to and moves against the force of coil spring 38 toward the opposing face 37 of pole piece 20. As previously noted, force of magnetic attraction between pole 20 and ballarmature 32 as a function of separation or air gap therebetween is coordinated with, and preferably is identical to, spring rate of spring 38, both magnetic and spring forces preferably being linear functions of their respective variables. Displacement of ball-armature 32 against spring 38 toward the opposing face 37 of pole 20 thus varies substantially linearly with current applied to solenoid coil 22. Linear motion or displacement of spool 58 likewise varies linearly with valve control current so as to vary (decrease) control pressure to the external device accordingly. As ball-armature 32 moves toward pole face 37, spool land 62 gradually closes passages 66, thus restricting the flow between spool land 62 and passage 66 and, at the same time, reducing the restriction of flow between the spool land 60 and exhaust passage 68 to fluid sump 88. The ball size and armature travel are selected in a manner such that the magnetic attractive force is compatible with the desired management characteristics for the flow and pressure requirements. Typical ball size range is 3/16" to ⅜" in diameter. Typical ball armature travel range is 0.010" to 0.035", but not necessarily confined to this range.

FIG. 3 illustrates a valve 92 configured for pressure control operation in accordance with a modified embodiment of the invention. In valve 92 of FIG. 3 (and in the valves of FIGS. 4 and 5), elements functionally identical to those hereinabove described in detail in connection with FIGS. 1 and 2 are indicated by correspondingly identical reference numerals, and modified but generally functionally related elements are indicated by correspondingly identical reference numerals and a suitable suffix "a," etc. In valve 92, housing **16*a* of force motor 12*a* is configured such that pole 20*a* extends axially away from rather than toward valve spool 58*a*. Ball-armature 32 is slidably journalled within a passage 34*a* in pole piece 30*a* crimped or otherwise fastened to housing 16*a*. Ball-armature biasing spring 38*a* is positioned within valve body cavity 64 and engages ballarmature 32 through spool 58*a* and through a finger 94 which integrally coaxially projects from spool head 60 through passage 52*a* in pole 20*a* into abutting engagement with ballarmature 32. Finger 65 functions primarily as a guide for spring 38*a* in the embodiment of FIG. 2. The rest position of spool 58*a* is adjusted by means of a set screw 99 of nonmagnetic construction which engages ball-armature 32 within force motor 12*a***.

In the embodiment of FIG. 3, valve body passages 72,66 are connected (by a manifold not shown) to fluid sump 88, passages 68 are connected to pump 82, and passages 70 are again connected to the device (not shown) to be controlled. A further fluid passage 96 extends axially and then radially within valve body **14*a* from one controlled-pressure passage 70 to the cavity 98 between spool land 60 and stator base 18*a* for applying balancing control pressure against the opposing face of spool land 60. In both of the pressurecontrol implementations of FIGS. 1-3, control feedback pressure is thus balanced against armature-biasing spring 38** and maintains a force balance on the associated valve spool to obtain desired control pressure as supply pressure may vary.

Figure 5:
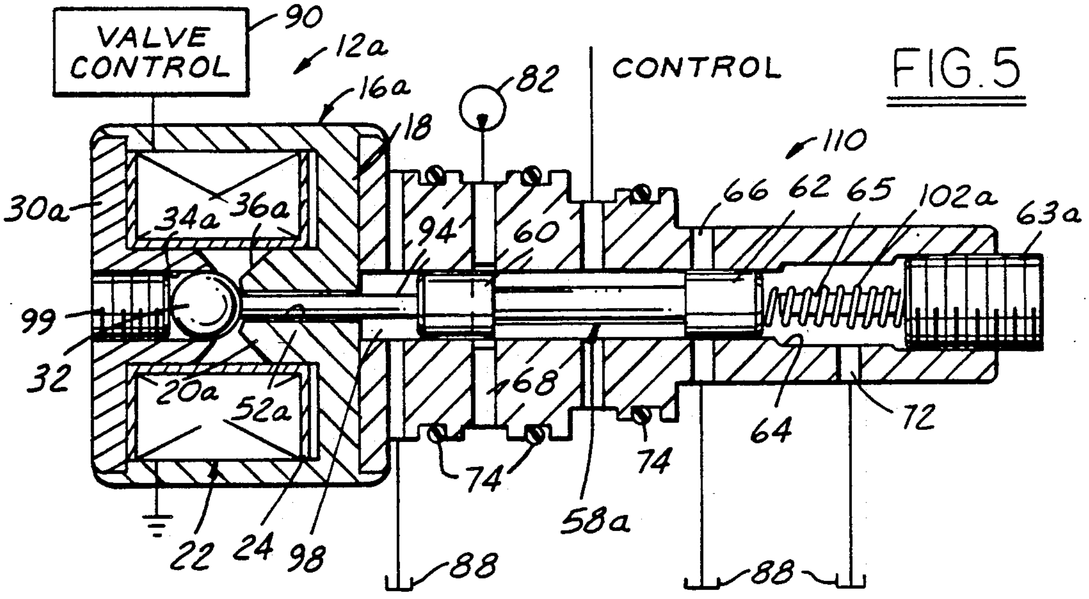

FIG. 4 illustrates a valve 100 which is substantially identical to valve 10 of FIGS. 1-2 but is configured for flow control operation. Specifically, valve body passage 72 is connected to fluid sump 88, and a coil spring 102 is captured within valve body cavity 64 between stop 63 and the opposing face of spool land 62. The force of spring 102 thus replaces the force of control pressure within cavity 64 in the embodiment of FIG. 4 to bias spool 58 into abutting engagement with ball-armature 32. Control feedback pressure is not required in this application. Likewise, valve 110 illustrated in FIG. 5 is substantially identical to valve 92 hereinabove described in detail in connection with FIG. 3, but with passage 72 connected to fluid sump 88, with passage 96 deleted, with cavity 98 connected to sump 88, and with spring **102*a* serving the dual purpose of biasing ball-armature 32 against magnetic attraction to pole piece 20*a* and maintaining spool 58*a* in abutting engagement with ball-armature 32 through finger 94**.

Electromagnetic variable force motors **12,12*a* and solenoid valves 10,92,100,110 hereinabove described in detail thus fully satisfy all of the objects and aims previously set forth. In accordance with a distinguishing feature of the present invention, ball-armature 32 in each such embodiment exhibits minimal friction with the surrounding structure, thus substantially eliminating armature and valve position hysteresis which has been characteristic of the prior art. Ball-armatures of ferromagnetic construction as described are readily and economically available in a variety of sizes, and thus are substantially less expensive than are the complex armature structures characteristic of the prior art. In modified constructions of the embodiments of FIGS. 1 and 4, the ball-armature and valve spool could be formed as an integral structure. However, separate armature and spool constructions are preferred both to reduce cost of the respective elements, and also to reduce criticality of coaxial alignment of armature journal surfaces 34** with the stator pole and spool axes.

It will also be appreciated that the valve structures and corresponding pressure and/or flow characteristics hereinabove described are strictly exemplary of the general principles of the invention in its broadest aspects. Other pressure or flow characteristics—e.g., nonlinear characteristics—can be readily obtained employing conventional valve design principles. Indeed, an important feature of the force motor of the present invention is that it may be readily employed with little or no modification in combination with valve bodies of diverse design, and the valve designer may assume that armature and spool motion will be a preselected function of stator current —e.g., linear—and may design the valve accordingly.

The invention claimed is:

1. A solenoid valve comprising:

a valve body having fluid passages extending therethrough and a valve element variably positionable within said valve body for controlling fluid flow through said passages, a housing of ferromagnetic construction mounted on said valve body and including a pole of ferromagnetic construction having a central axis and electrical coil means surrounding said pole, an armature comprising a ball of ferromagnetic construction positioned coaxially with said pole, said ballarmature and said pole having a preselected characteristic of magnetic attractive force between said ball-armature and said pole as a function of separation between said ballarmature and said pole when current is applied to said coil means, means coupling said ball-armature to said valve element, and spring means positioned to engage said ballarmature and to urge said ball-armature axially away from said pole, said spring means having a spring rate substantially equal to said preselected characteristic.

2. A solenoid valve comprising:

a valve body having a bore with a central axis and fluid passages extending radially from said bore, a valve element axially slidably captured in said bore, said element cooperating with said passages for varying flow of fluid through said bore to and from said passages, a housing of ferromagnetic construction mounted on said valve body, said housing including a pole piece of ferromagnetic construction coaxial with said bore and electrical coil means circumferentially surrounding said pole, an armature comprising a ball of ferromagnetic construction positioned coaxially with said pole and coupled to said valve element, and spring means coupled to said ball-armature and urging said ball-armature axially away from said pole.

3. The valve set forth in claim 2 wherein said ballarmature is of separate construction from said valve element, said spring means being positioned to urge abutting engagement between said ball-armature and said valve element.

4. The valve set forth in claim 2 wherein said ballarmature and said pole have a preselected characteristic of magnetic attractive force between said ball-armature and said pole as a function of separation between said ballarmature and said pole when current is applied to said coil means, and wherein said spring has a spring rate substantially equal to said preselected characteristic.

5. The valve set forth in claim 4 wherein said preselected characteristic and said spring rate are both substantially linear, such that displacement of said ballarmature toward said pole against said spring means varies substantially linearly with current in said coil means.

6. The valve set forth in claim 2 further comprising a housing enclosing said pole piece and armature, said housing including journal means guiding axial motion of said ballarmature and limiting motion of said ball-armature laterally of said axis.

7. The valve set forth in claim 6 wherein said housing which includes said journal means is of ferromagnetic construction.

8. The valve set forth in claim 2 wherein said pole has a pole face axially opposed to said ball-armature, said pole face tapering narrowingly in the direction of said ballarmature.

9. The valve set forth in claim 8 wherein said pole is hollow, and wherein said spring means comprises a coil spring captured within said hollow pole, and means extending through said pole face to engage said ball-armature.

10. The valve set forth in claim 9 wherein said pole has a central cylindrical cavity in which said coil spring is disposed, said means extending through said pole face comprising a pintle having a base captured withinsaid coil spring, a finger extending through said pole face to engage said ball-armature, and a body with a diameter less than that of said cylindrical bore.

11. The valve set forth in claim 2 wherein said valve element comprises a valve spool having lands which cooperate with said passages for varying flow of fluid through said passages.

12. The valve set forth in claim 11 wherein said valve body includes means having a cavity opening from an end of said bore remote from said ball-armature.

13. The valve set forth in claim 12 wherein said valve body includes a passage extending radially from said cavity through said valve body.

14. The valve set forth in claim 13 further comprising a coil spring captured within said cavity and urging said spool into engagement with said ball-armature.

15. The valve set forth in claim 14 wherein said coil spring comprises said spring means.

16. The valve set forth in claim 2 wherein said valve element comprises a valve spool structurally separate from said ball-armature having axially spaced first and second lands, said passages including first and second passages axially spaced from each other by a distance corresponding to spacing between said lands, and a third passage radially extending from said bore between said first and second passages.

17. The valve set forth in claim 16 wherein said valve body includes a cavity opening from an end of said bore adjacent to said ball-armature, and means connecting said cavity to said third passage.

18. The valve set forth in claim 2 further comprising means limiting motion of said ball-armature away from said pole.

19. The valve set forth in claim 18 wherein said motionlimiting means comprises adjustable means.

20. The valve set forth in claim 13 further comprising means for interconnecting said cavity with said bore between said valve spool lands.

* * * * *